Patented Apr. 3, 1951

2,547,542

UNITED STATES PATENT OFFICE 2,547,542

AROMATIC IMIDO-ESTERS PRODUCTION

Stanley P. Rowland, Philadelphia, Pa., assignor to Rohm & Haas Company, Philadelphia, Pa., a corporation of Delaware No Drawing. Application November 29, 1949, Serial No. 130,067

6 Claims. (Cl. 260—326)

This invention relates to a new process for the preparation of aromatic imido-esters which have the general formula

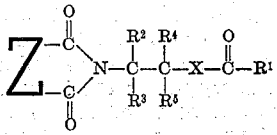

in which X represents an atom of oxygen or sulfur; Z represents a phenylene group, $C_6H_4$, or a naphthylene group, $C_{10}H_6$; the characters $R^2$, $R^3$, $R^4$ and $R^5$ represent hydrogen atoms or monovalent, organic radicals which are unreactive with acid anhydrides and which therefor are free of hydroxyl groups or amino-hydrogen atoms and which preferably are hydrocarbon groups; and in which $R^1$ also represents the same kind of monovalent, organic radical as $R^2$ to $^5$ but does not represent a hydrogen atom.

The process involves a new chemical reaction which comprises chemically combining (a) phthalic anhydride or a naphthalic anhydride with (b) an oxazoline or a thiazoline having the formula

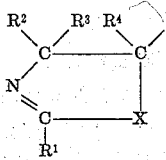

in which the R's and X have the significance described above. This reaction takes place according to the following equation:

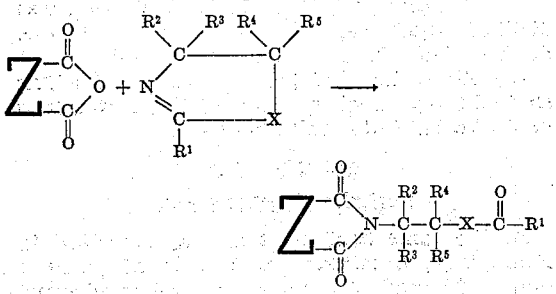

A specific example in which phthalic anhydride and a particular oxazoline, 2-heptadecenyl oxazoline, are reacted may make for a clearer understanding, at the outset, of the new reaction.

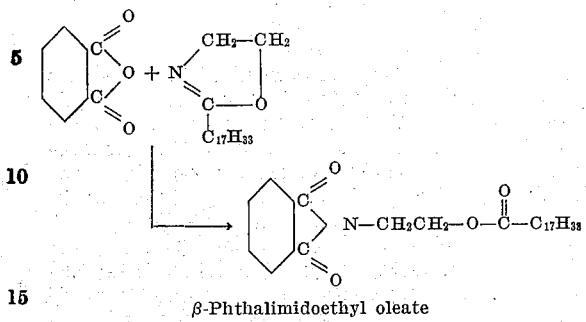

β-Phthalimidoethyl oleate

Careful study has shown that naphthalic anhydrides described herein react in the same manner as phthalic anhydride, and that the oxazolines and thiazolines described herein react in the same manner as the oxazoline above. That is, the groups represented by Z, X and the five R's in the general formula given above remain intact and unchanged during the process, and the reaction does in fact take the course shown above.

The organic radicals which are represented by R's $^1$ to $^5$ must be unreactive with acid anhydrides. That is, they must be entirely free of such substituents as hydroxyl groups and amino hydrogen atoms which are capable of reacting with acid anhydrides, so that no interfering side-reactions can take place. It is preferred that these radicals be hydrocarbon radicals such as alkyl, aryl, alkaryl, aralkyl and cycloalkyl groups. The following list includes examples of such suitable, hydrocarbon radicals: methyl, ethyl, isopropyl, sec.-butyl, tert.-amyl, 2-ethylhexyl, lauryl, n-tetradecyl and octadecyl groups and the isomers of these groups; phenyl, tolyl, benzyl, p-octylphenyl, m-xylyl, 2,4-di-tert.-amyl phenyl; cyclohexyl; and naphthyl groups. In addition, the hydrocarbon group which is represented by $R^1$ can be unsaturated. In fact a particularly valuable group of products are those in which $R^1$ is unsaturated. Such products have the added advantage of being more reactive and subject to oxidation and polymerization due to their unsaturation.

Although those reactants are preferred in which the substituents represented by the R's are hydrocarbon radicals, it is a fact that imido-esters are readily prepared from the anhydrides and azolines whose substituents, R's [1] to [5], also contain other elements in addition to carbon and hydrogen. Such substituents however must be inert in the sense that they do not undergo reaction themselves with acid anhydrides. Thus, halogen groups may be present on the R-substituents as well as nitro, ether, keto, aldehydo, sulfonic, carboxyl, or tertiary amino groups.

The process of this invention gives rise to a large number of compounds, many of which were unknown heretofore. All of the compounds, however, fall within the class described by the above general formula. A large class of operable oxazolines and thiazolines are known and are shown in the literature. All of these react with phthalic and naphthalic anhydrides to form phthalimido and naphthalimido esters by the methods set forth in the examples below. All that is required is to substitute an equivalent amount of one azoline; i. e. an oxazoline or a thiazoline, for the particular azolines shown in the examples. Thus in the same manner, the following azolines, of which the skeletal structure is

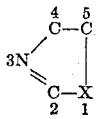

and in which X is an oxygen atom in oxazolines or a sulfur atom in thiazolines, combine in equimolecular amounts with phthalic and naphthalic anhydrides to form the corresponding phthalimido and naphthalimido esters: 2-phenyl azolines; 2-p-tolyl azolines; 2-o-tolyl azolines; 2-benzyl azolines; 2-(o-, m-, and p-nitrophenyl) azolines; p-chlorobenzyl azolines; 2-undecyl-5-chloromethyl azolines; 2,4-diphenyl azolines; 2,5-diphenyl azolines; 2-phenyl-5-chloromethyl azolines; 2-(p-nitrophenyl)-5-chloromethyl azolines; 2-(p-nitrophenyl)-5-diethylaminomethyl azolines; 2-(p-nitrophenyl)-5-dibutylaminomethyl azolines; 2-phenyl-5,5-dimethyl azolines; 2-phenyl-5-phenyl-5-methyl azolines; 2-(m- and p-nitrophenyl)-5,5-dimethyl azolines; 2-(α- or β-naphthyl) azolines; 2-p-methoxyphenyl azolines; 2-p-ethoxyphenyl azolines; 2-p-butoxyphenyl azolines; 2-(m-nitro-p-methoxyphenyl) azolines; 2-(p-nitrophenyl)-4-butyl azolines; 2-(p-nitrophenyl-4-phenyl azolines; 2-phenyl-5-methyl azolines; 2-phenyl-5-ethyl azolines; 2-benzyl-5-methyl azolines; 2-styryl-5-methyl azolines; 2-(o- and p-tolyl)-5-methyl azolines; 2-(α and β-naphthyl)-5-methyl azolines; 2-phenyl-4,5-dimethyl azolines; 2-(p-nitrophenyl)-4,5-dimethyl azolines; 2-phenyl-4-methyl-5-ethyl azolines; 2,4,5-trimethyl azolines; 2-undecyl-4,4-dimethyl azolines; 2-phenyl-4-methyl-4-ethyl azolines; 2-phenyl-4,4-dimethyl azolines; 2-heptadecyl azolines; 2-heptadecenyl azolines; 2-heptadecyl-4,4-dimethyl azolines; 2-heptadecenyl-5-ethyl azolines; 2-phenyl-4-methyl-5-phenyl azolines; 2-methyl-4,5,5-triphenyl azolines; 2-phenyl-4-methyl-5,5-dibenzyl azolines; 2-heptadecyl-5-diethylaminomethyl azolines; 2-heptadecyl-5-ethyl azolines; 2-heptadecenyl-4,5,5-trimethyl azolines; 2,4,5-tri-isobutyl azolines; 2-heptadecyl-4,4,5,5-tetramethyl azolines; 2-methyl-4-isoamyl-4-methyl azolines; 2-heptadecyl-4-propyl-5-methyl azolines; 2-heptadecenyl-4,4-dimethyl-5-isopropyl azolines; 2-decyl-4,4-dibutyl-5-methyl azolines; and 2-heptadecyl-5-methyl-5-ethyl azolines.

The naphthalic anhydrides which are known to react according to the process of this invention include 1,8-naphthalic, 1,2-naphthalic, and 2,3-napthalic anhydrides. Preference is given to the 1,8-naphthalic anhydride due to its availability. Furthermore, the anhydrides can be substituted by halogen and nitro groups without losing their reactivity with the azolines.

The reactions between the phthalic and naphthalic anhydrides and the azolines takes place fairly readily and often exothermically. Reaction takes place even at room temperature (20° C.) but the rate of reaction is unnecessarily slow. Heating of the reactants accelerates the rate of reaction and for this reason a minimum temperature of 50° C. is recommended. Temperatures up to 300° C. are operable but at the higher temperatures by-products are frequently formed, including polymeric materials when the group represented by $R^1$ is unsaturated. Accordingly, an upper temperature of 250° C. is much preferred. For convenience, inert solvents can be employed. Likewise catalysts, such as alcoholates, zinc chloride and the like, can be used, although ordinarily the reaction takes place rapidly enough in the absence of catalysts. Other expedients well known to those skilled in the art, such as variations in pressure, solvent-extraction of the product, excess of one reactant, particularly the azoline, and the like, can be used without departing from the spirit of this invention which is to prepare phthalimido and naphthalimido esters by reacting, preferably under the influence of heat, equimolar amounts of a phthalic or a naphthalic anhydride and an oxazoline or a thiazoline.

The following examples serve to illustrate the process of this invention:

EXAMPLE 1

*Phthalimiodethyl acetate*

A solution of 22.2 grams of phthalic anhydride, 12.75 grams of 2-methyl oxazoline in 35 grams of dioxane was heated in an autoclave at 170° C. for 2.3 hours after which the mixture was poured into water at room temperature. The solid which precipitated was removed by filtration, dried and crystallized from dry ethanol. After recrystallization from dry ethanol the product had a melting point of 88.5° C. A mixed melting point with a known sample of phthalimidoethyl acetate prepared by the acetylation of hydroxyethyl phthalimide showed no depression.

EXAMPLE 2

*Phthalimidoethyl 2-ethylhexoate*

A mixture of 1 mole of phthalic anhydride and 1 mole of 2-ethylpentyl oxazoline was heated and stirred for 8 hours at 200° C. in a three-necked balloon flask equipped with thermometer, reflux condenser and mechanical stirrer. At the end of the heating period the product, a fluid, was distilled under vacuum. The fraction boiling at 165°–175° C. at 1 mm. of pressure (Hg) was phthalimidoethyl 2-ethylhexoate. Analysis showed the product to contain 4.42% nitrogen as against a calculated value of 4.41%.

EXAMPLE 3

*Phthalimidoethyl oleate*

In the same equipment as was described in Example 2, a mixture of 1 mole of phthalic anhydride and 1.1 moles of 2-heptadecenyl oxazoline (prepared from oleic acid and ethanol amine) was heated for 4 hours at 200° C. The fluid product was fractionally distilled under vacuum and a fraction was isolated which boiled at 234°–244° C. and 1 mm. of pressure. The analysis showed this compound to contain 3.14% nitrogen as against a calculated nitrogen-content of 3.07% for phthalimidoethyl oleate.

EXAMPLE 4

*Phthalimidoisopropyl linoleate*

A mixture of 1 mole of phthalic anhydride and 1.1 moles of 2-heptadecadienyl-4-methyl oxazoline (prepared from aminoisopropanol and linoleic acid) was heated in an atmosphere of carbon dioxide for 4 hours at 200° C. in a balloon flask equipped with reflux condenser, thermometer, stirrer and gas-inlet tube. The product was fluid and was fractionally distilled under vacuum. The fraction boiling at 230°–240° C. and 1 mm. of pressure consisted of phthalimidoisopropyl linoleate. Analysis of this compound gave a value of 3.03% nitrogen as against a calculated value for the compound of 3.00%.

EXAMPLE 5

*Naphthalimidoethyl acetate*

In an autoclave as was used in Example 1, a mixture of 0.1 mole of 1,8-naphthalic anhydride and 0.1 mole of 2-methyl-oxazoline was heated at 225° C. for two hours after which the autoclave was cooled and opened. The reaction mixture which was a solid mass was crystallized twice from dry ethanol. A 63% yield was obtained of naphthalimidoethyl acetate which melted at 130°–132° C. (Analysis: Found 68.00% carbon; 4.63% hydrogen; 4.95% nitrogen as against a calculated value for the compound, $C_{16}H_{13}O_4N$, of 67.83% carbon; 4.63% hydrogen; 4.94% nitrogen).

EXAMPLE 6

*Phthalimidoisopropyl iso-valerate*

In the equipment as is described in Example 2, was heated at 190°–225° C. for 4.5 hours a mixture of 1 mole of phthalic anhydride and 1.2 moles of 2-isobutyl-5-methyl oxazoline. After reaction, the product was distilled under vacuum and the main fraction collected at 170°–190° C. and 3 mm. pressure represented a yield of the isovalerate equal to 90% of theory. The distilled material crystallized on cooling to room temperature.

EXAMPLE 7

*Phthalimidoisopropyl laurate*

This product which is a crystalline solid at room temperature was prepared in a 93% yield by heating 1 mole of phthalic anhydride and 1.1 moles of 2-undecyl-5-methyl oxazoline at 240° C. for 2.5 hours. The product distilled at 200°–210° C. and 1 mm. of pressure and had a nitrogen-content of 3.7% as against a calculated value of 3.62%.

EXAMPLE 8

*Phthalimidoisopropyl "linoleate"*

One half mole of phthalic anhydride and 0.55 mole of the mixed oxazolines, derived from the mixed fatty acids of soybean oil of which the major component is linoleic acid, were agitated and heated at 200° C. for 3 hours under an atmosphere of nitrogen. The reaction mixture was then transferred to a modified Claisen distilling flask and was fractionally distilled under vacuum. The phthalimidopropyl ester of soybean oil fatty acids which was collected at 240°–260° C. and 1 mm. of pressure was equal to a 72% yield.

EXAMPLES 9–23

Further demonstration of the general applicability of the process of this invention was made by reacting phthalic or naphthalic anhydrides with various oxazolines and thiazolines at 240° C. for four hours after which the extent of reaction was determined by titration of the unreacted anhydride with standard caustic solution. Following is a tabulation of the reactants and the extent to which they reacted with the formation of the corresponding phthalimido or naphthalimido esters or thioesters.

| Anhydride | Azoline | Extent of Reaction |
|---|---|---|
|  |  | *Per cent* |
| Phthalic | 2-Undecyl-5-methyl oxazoline | 97.5 |
| Dichlorophthalic | do | 91.9 |
| Tetrachlorophthalic | do | 54.4 |
| 1,8-Naphthalic | do | 69.3 |
| 1,3-Nitrophthalic | do | 86.1 |
| Dichlorophthalic | 2-Methyl oxazoline | 85.1 |
| Dichlorophthalic | 2-Methyl-5-methyl thiazoline | 67.0 |
| Phthalic | 2-p-Chlorophenyl oxazoline | 86.5 |
| Dichlorophthalic | do | 76.1 |
| Naphthalic | do | 65.2 |
| Naphthalic | 2-Methylthiazoline | 82.0 |
| Phthalic | 2-Phenyl-4,4,5-trimethyl oxazoline | 81.0 |
| Phthalic | 2-p-Nitrophenyl-5-ethyl oxazoline | 93.0 |
| 3-Nitrophthalic | do | 67.3 |
| Sulfaphthalic | 2-Heptadecyl-5-methyl oxazoline | ca. 100 |

EXAMPLE 24

*Phthalimidoethyl thioacetate*

By the process of Example 2, one half mole each of phthalic anhydride and 2-methyl thiazoline were heated at 140° C. for one hour. The acid number of the product was 39.2, corresponding to 91% of complete reaction to phthalimidoethyl thioacetate. The product when recrystallized from ethanol had a melting point of 113–114° C. and a sulfur-content of 12.96% by analysis.

It will be noted from the above examples that the naphthalic anhydrides react in the same way as the phthalic anhydrides and that the oxazolines and thiazolines also react alike. It will also be noted that the substituents represented by the R-characters do not take part in the reaction and do not interfere with the reaction between the anhydrides and the azolines.

The products of this invention have a wide variety of uses. Many of them have marked properties as regulants for plant growth. Others, especially those containing sulfur, are effective as lube oil-additives. Still others, particularly those which contain long hydrocarbon substituents, or a plurality of shorter hydrocarbon groups, are useful as plasticizers for synthetic plastics.

I claim:

1. A process for the preparation of β-phthalimidoethyl esters and β-naphthalimidoethyl esters of the general formula

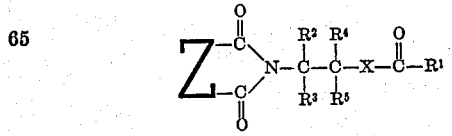

in which X represents an atom of an element from the class consisting of oxygen and sulfur; Z represents a divalent radical from the class consisting of phenylene and naphthylene radicals; the characters $R^2$, $R^3$, $R^4$ and $R^5$ represent members of the class consisting of hydrogen atoms and alkyl, aryl, alkaryl, aralkyl, and cycloalkyl groups and R¹ represents a member of the class consisting of alkyl, aryl, alkaryl, aralkyl, and cycloalkyl groups and monounsaturated and di-unsaturated aliphatic hydrocarbon groups containing not more than 17 carbon atoms, which process comprises chemically reacting at a temperature of 20° C. to 300° C. equimolar amounts of (1) a member of the class consisting of phthalic and naphthalic anhydrides and (2) an azoline of the general formula

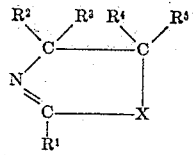

in which the characters R¹, R², R³, R⁴ and R⁵ have the significance described above.

2. A process for the preparation of β-phthalimidoethyl oleate which comprises chemically reacting at a temperature from 50° C. to 250° C. equimolar amounts of phthalic anhydride and 2-heptadecenyl oxazoline.

3. A process for the preparation of phthalimidoiso-propyl linoleate which comprises chemically reacting at a temperature from 50° C. to 250° C. equimolar amounts of phthalic anhydride and 2-heptadecadienyl-5-methyl oxazoline.

4. A process for the preparation of β-phthalimidoethyl thiolinoleate which comprises chemically reacting at a temperature from 50° C. to 250° C. equimolar amounts of phthalic anhydride and 2-heptadecadienyl thiazoline.

5. A process for the preparation of β-phthalimidoethyl laurate which comprises chemically reacting at a temperature from 50° C. to 250° C. equimolar amounts of phthalic anhydride and 2-undecenyl oxazoline.

6. A process for the preparation of phthalimidoiso-propyl stearate which comprises chemically reacting at a temperature from 50° C. to 250° C. equimolar amounts of phthalic anhydride and 2-heptadecyl-5-methyl oxazoline.

STANLEY P. ROWLAND.

REFERENCES CITED

The following references are of record in the file of this patent:

UNITED STATES PATENTS

| Number | Name | Date |
|---|---|---|
| 2,256,157 | Watt | Sept. 16, 1941 |

FOREIGN PATENTS

| Number | Country | Date |
|---|---|---|
| 143,272 | Switzerland | Jan. 16, 1931 |
| 563,635 | Great Britain | Aug. 23, 1944 |